June 7, 1960  R. A. YONKERS  2,939,163
TUBULAR SECTIONAL HANDLE WITH INTERLOCKING MEANS
Filed July 21, 1958
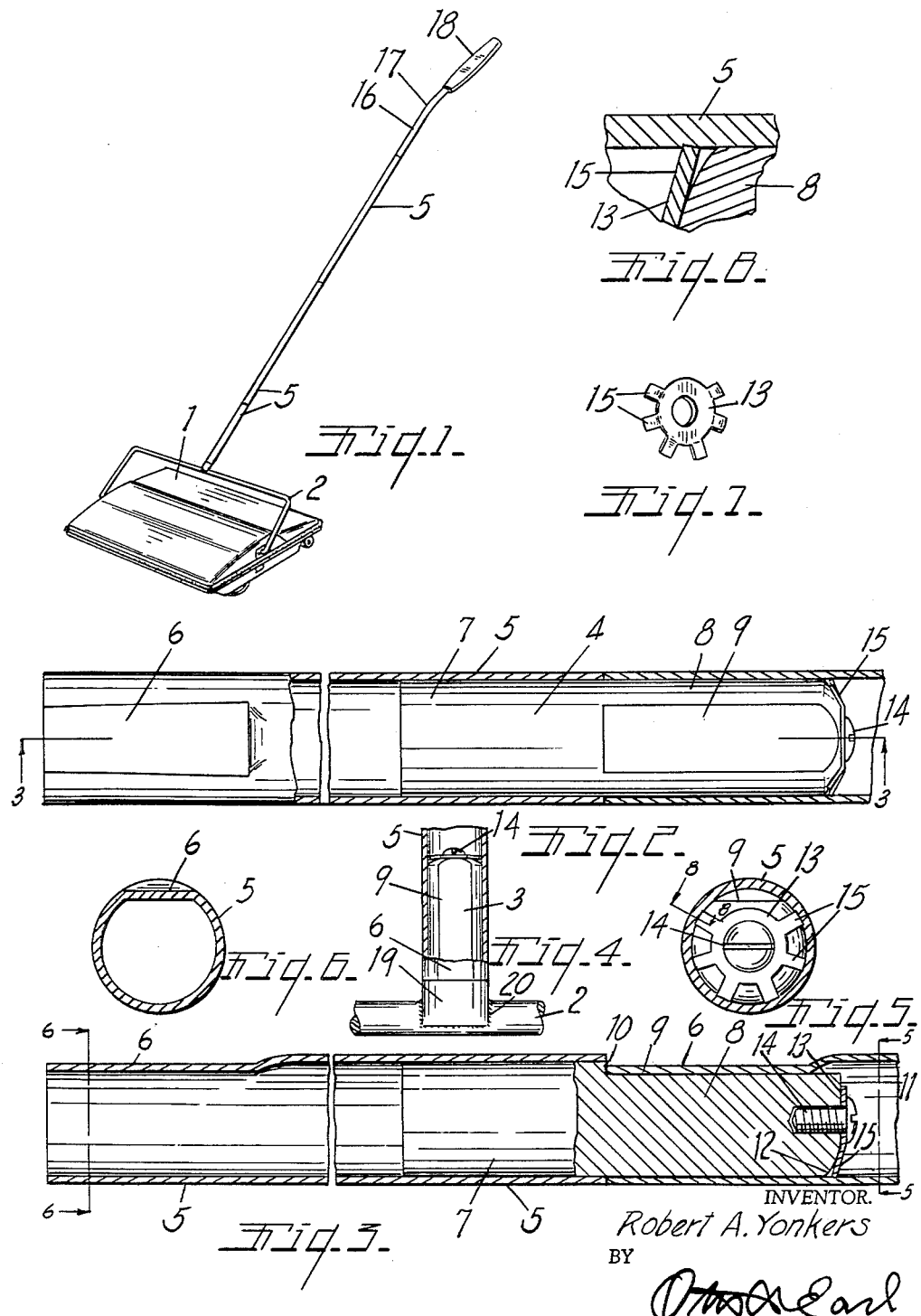
INVENTOR.
Robert A. Yonkers
BY
ATTORNEY.

United States Patent Office 2,939,163
Patented June 7, 1960

2,939,163

TUBULAR SECTIONAL HANDLE WITH INTERLOCKING MEANS

Robert A. Yonkers, Grandville, Mich., assignor to Bissell Carpet Sweeper Company, Grand Rapids, Mich.

Filed July 21, 1958, Ser. No. 749,849

4 Claims. (Cl. 15—145)

This invention relates to a sectional implement handle which is well adapted for use as a handle for carpet sweepers, floor brushes, wall brushes, mops and the like.

The main objects of this invention are:

First, to provide an implement handle comprising a plurality of sections which may be shipped in the knockdown and the sections readily and quickly assembled by relatively unskilled persons and the parts when assembled are securely connected, the connections being concealed.

Second, to provide a sectional handle having these advantages in which the sections may be coated if desired and the coating is not effected by assembling the sections.

Objects relating to details and economies of the invention will appear from the description to follow. The invention is defined and pointed out in the claims.

A preferred embodiment of the invention is illustrated in the accompanying drawing, in which:

Fig. 1 is a perspective view of a carpet sweeper provided with a handle embodying my invention.

Fig. 2 is an enlarged fragmentary view partially in longitudinal section illustrating details of the connecting means for the sections.

Fig. 3 is an enlarged fragmentary view partially in longitudinal section on a line corresponding to line 3—3 of Fig. 2.

Fig. 4 is a fragmentary view partially in longitudinal section illustrating the connection for the inner end section of the handle to the implement coupling yoke.

Fig. 5 is a cross sectional view on a line corresponding to line 5—5 of Fig. 3.

Fig. 6 is a cross sectional view on a line corresponding to line 6—6 of Fig. 3.

Fig. 7 is a perspective view of the dowel clutch member.

Fig. 8 is an enlarged fragmentary view on a line corresponding to line 8—8 of Fig. 5.

In the accompanying drawing I have illustrated my invention as embodied in a handle particularly adapted for use on a carpet sweeper brush but it should be understood that the handle is desirable for use in many other relations such, for example, as floor brushes, wall brushes, mops and the like. The applicant is aware that sectional handles adapted for such uses are old, for example, as illustrated in the Siebert Patent No. 2,712,950, issued July 12, 1955. Handles of this type are sometimes subject to quite severe use and it is not only important to provide means by which the sections may be readily assembled but also to provide connections for the sections which are very secure when the connections are assembled and constitute joint reinforcing means.

In the accompanying drawing I have illustrated my handle as adapted to a carpet sweeper, the carpet sweeper 1 being conventionally illustrated in Fig. 1. The handle comprises a coupling yoke 2 having a shank or handle connecting dowel designated generally by the numeral 3 projecting centrally from the yoke. This dowel 3 has certain features that are the same as the dowels 4 for connecting the handle sections 5.

The handle sections 5 are formed of tubing and are cylindrical with the exception that at one end each section is provided with a flattened segment 6 at one end. The dowel 4 has an end portion 7 which is a forced retaining fit or is otherwise fixedly secured in the other end of the handle section. The end portion 8 of the dowel projects from the handle section, and has a flattened segment 9 dimensioned to slidably fit within the flattened segment 6 of the handle. The end edges of the handle sections abut with the exception of the flattened portions 6 of the section which abuts against the shoulder 10 resulting from the flattened segment 9 of the dowel.

The projecting end 11 of the dowel is beveled at 12, see Figs. 2 and 3. Each dowel has a clutch member 13 secured to the end thereof as by means of the screws 14 threaded into the ends of the dowels, see Fig. 3. These clutch members are of stampings desirably of a good quality spring steel and they are provided with radially projecting clutch prongs 15, the clutch members generally considered being dished. The beveled ends of the dowels receive the prongs which are in the embodiment illustrated inclined relative to the longitudinal axis of the dowels. This is illustrated in Figs. 2, 3 and 5.

The prongs 15 are of such length that they project laterally of the dowel and when a handle section is sleeved or telescoped over a dowel these clutch prongs yield to permit such telescoping engagement but they are in spring tensioned engagement with the interior of the handle section and handle section and dowel are effectively clamped together. With this arrangement all that is necessary to engage the parts is to slip the handle sections over the projecting portions of the dowels. The coengaging flattened segments of the dowels and handle sections provide a very simple and practical means for preventing relative rotative movement of the sections.

In the handle illustrated the outer end handle section 16 is angled at 17 and provided with a grip 18, desirably flat, to facilitate grasping. The dowel or shank 3 on the handle yoke 2 is provided with a base portion 19 which corresponds generally to the dowel portion 7 which is telescoped into the handle section. However, this portion 19 of the dowel or shank fixedly secured to the yoke as by welding as indicated at 20. Otherwise the dowel or yoke shank 3 is the same as that described for the handle sections.

With this arrangement the lower section of the handle is secured to the yoke in the same manner that the handle sections are connected to each other.

I have illustrated and described my invention in a very practical commercial embodiment thereof. I have not attempted to illustrate or describe other adaptations as it is believed this disclosure will enable those skilled in the art to embody or adapt the invention as may be desired.

Having thus described the invention what is claimed as new and desired to secure by Letters Patent is:

1. A sectional handle for an implement comprising an outer handle member having an angularly disposed grip portion and a plurality of straight handle members the inner of which is adapted to be connected to an implement, said handle members being tubular and substantially cylindrical and having dowels fixedly secured therein and projecting from one end thereof, the projecting ends of the dowels being segmentally flattened and being a telescoping fit within the adjacent handle member, the dowel receiving ends of said handle members having flattened portions nonrotatably engaging the flattened portions of the dowels, and resiliently springable clutch members disposed on the ends of each of said dowels and secured thereto, each of said clutch members having a plurality of radially projecting springable clutch prongs disposed in spaced relation to the dowels and of such length as to initially project beyond the periphery of the dowels and of such resilience as to permit the handle members being telescopingly sleeved over the dowels, such clutch prongs when the handle members are so telescopingly engaged being in clutch retaining engagement with the interiors of the handle members, said flattened portion of said dowels being aligned so that the angularly disposed grip portion of the outer handle member is positioned in predetermined relation to an implement to which the inner handle member is connected.

2. A sectional handle for manually manipulated implements comprising a plurality of substantially cylindrical tubular handle members having dowels fixedly secured therein and projecting from one end thereof, the projecting ends of the dowels being segmentally flattened and being a telescoping fit within the adjacent handle member, the dowel receiving ends of the handle members having flattened portions nonrotatably engaging the flattened portions of the dowels, and resiliently springable clutch members disposed on and fixedly secured to the ends of said dowels, each of said clutch members having a plurality of radially projecting springable clutch prongs thereon disposed in spaced relation to the opposed end portions of the dowels and of such length as to initially project beyond the peripheries of the dowels and being of such resilience as to permit the handle members being telescopingly sleeved over the dowels, said clutch members when the handle members are so telescopingly engaged being in clutching retaining engagement with the interiors of the handle members with the adjacent ends of the sections other than said flattened portions in end abutting relation.

3. A sectional handle comprising an implement coupling member, an outer handle member having an angularly disposed grip portion and a plurality of straight handle members intermediate said outer handle member and said coupling member, said handle members being tubular and substantially cylindrical, said coupling member and said intermediate handle members having dowels fixedly secured therein and projecting from one end thereof, the projecting ends of the dowels being segmentally flattened and being a telescoping fit within the adjacent handle member, the dowel receiving ends of said handle members having flattened portions fittingly receiving the flattened portions of the dowels, the outer ends of the dowels being beveled, and resiliently springable clutch members disposed on the ends of each of said dowels and secured thereto, each of said clutch members having a plurality of radially projecting springable clutch prongs disposed in spaced relation to the bevels of the dowels and of such length as to initially project beyond the periphery of the dowels and of such resilience as to permit an adjacent handle member being telescopingly sleeved over the dowels, said clutch prongs when the handle members are so telescopingly engaged being in clutch retaining engagement with the interiors of the handle members, said flattened portion of said dowels being aligned so that the angularly disposed grip portion of the outer handle member is positioned in predetermined relation to said coupling member when the several handle members are in assembled relation to each other and to the coupling member.

4. A sectional handle for an implement comprising an outer handle member having an angularly disposed grip portion and a plurality of straight handle members the inner of which is adapted to be connected to an implement, said handle members being tubular and substantially cylindrical and having dowels fixedly secured therein and projecting from one end thereof, the projecting ends of the dowels being segmentally flattened and being a telescoping fit within the adjacent handle member, the dowel receiving ends of said handle members having flattened portions non-rotatably engaging the flattened portions of the dowels, the outer ends of the dowels being beveled, and resiliently springable clutch members disposed on the ends of each of said dowels and secured thereto, each of said clutch members having a plurality of radially projecting springable clutch prongs disposed in spaced relation to the bevels of the dowels and of such length as to initially project beyond the periphery of the dowels and of such resilience as to permit the handle members being telescopingly sleeved over the dowels, said clutch prongs when the handle members are so telescopingly engaged being in clutch retaining engagement with the interiors of the handle members, said flattened portion of said dowels being aligned so that the angularly disposed grip portion of the outer handle member is positioned in predetermined relation to an implement to which the inner handle member is connected.

References Cited in the file of this patent

UNITED STATES PATENTS

| | | |
|---|---|---|
| 1,580,781 | Fitch | Apr. 13, 1926 |
| 2,039,594 | Hunter | May 5, 1936 |
| 2,463,796 | O'Rourke | Mar. 8, 1949 |
| 2,712,950 | Siebert | July 12, 1955 |
| 2,848,733 | Thornsbury | Aug. 26, 1958 |